United States Patent [19]

Ohta et al.

[11] Patent Number: 5,529,014
[45] Date of Patent: Jun. 25, 1996

[54] CAR-CARRIED INDICATING DEVICE

[75] Inventors: Noriaki Ohta; Hiroyasu Shiratori; Katsuma Sano; Nobuki Kanetaka; Tatsuo Ikegaya, all of Shizuoka, Japan

[73] Assignee: Yazaki Corporation, Tokyo, Japan

[21] Appl. No.: 38,637

[22] Filed: Mar. 29, 1993

[30] Foreign Application Priority Data

| Mar. 31, 1992 | [JP] | Japan | .................................. | 4-018660 |
| Jun. 30, 1992 | [JP] | Japan | .................................. | 4-172754 |
| Jul. 22, 1992 | [JP] | Japan | .................................. | 4-051513 |

[51] Int. Cl.⁶ .................................................. G01D 13/28
[52] U.S. Cl. .................... 116/286; 116/288; 116/DIG. 6; 116/DIG. 36
[58] Field of Search .................................. 116/286, 287, 116/288, 298, DIG. 6, DIG. 23, DIG. 36, 62.1; 250/463.1; 362/29, 84; 368/226

[56] References Cited

U.S. PATENT DOCUMENTS

| 2,459,694 | 1/1949 | Gordon | 250/486.1 |
| 4,536,656 | 8/1985 | Sowa | 250/463.1 |
| 5,004,913 | 4/1991 | Kleinerman | 374/131 X |
| 5,044,304 | 9/1991 | Tomita | 116/286 |
| 5,086,418 | 2/1992 | Marcus | 368/226 |
| 5,130,548 | 7/1992 | Sano et al. | 250/463.1 X |
| 5,161,480 | 11/1992 | Furuya et al. | 116/62.1 |
| 5,272,463 | 12/1993 | Furuya et al. | 116/286 X |

FOREIGN PATENT DOCUMENTS

| 4121607 | 1/1992 | Germany . |
| 4127924 | 3/1992 | Germany . |
| 1-167625 | 11/1989 | Japan . |
| 2-122314 | 10/1990 | Japan . |
| 429825 | 3/1992 | Japan . |

Primary Examiner—William A. Cuchlinski, Jr.
Assistant Examiner—Willie Morris Worth
Attorney, Agent, or Firm—Sughrue, Mion, Zinn, Macpeak & Seas

[57] ABSTRACT

It is object of the present invention to provide a car-carried indicating device which provides a clear indication by the needle and a good readability are secured, and which looks larger than the actual one, leading to improvement of the valid of commodity. In a car-carried indicating device, a character plate 1 includes a substantially circular transparent portion 2 at the indicating position, transparent numerals 3a and a scale 3b being circularly arrayed around the transparent portion 2. A disk-like needle plate 8, which is driven to turn in accordance with given measuring quantities, is made of light diffusion base material. The needle plate 8 is disposed on the front side of the character plate 1. A transparent slit 9 as a needle shining when it receives back-light, which is formed on the needle plate, is extended up to the circumferential outer end of the needle plate 8.

16 Claims, 14 Drawing Sheets

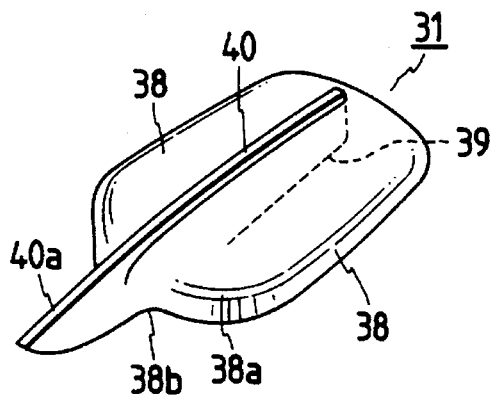
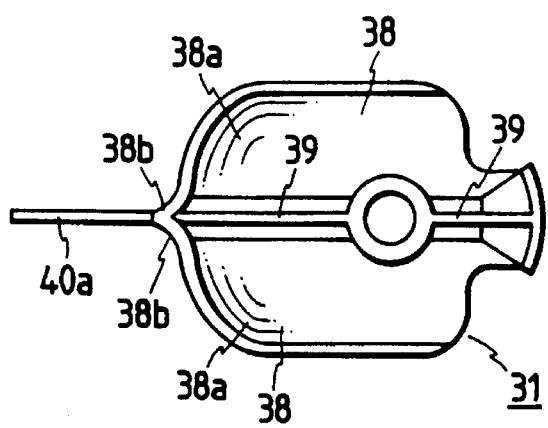
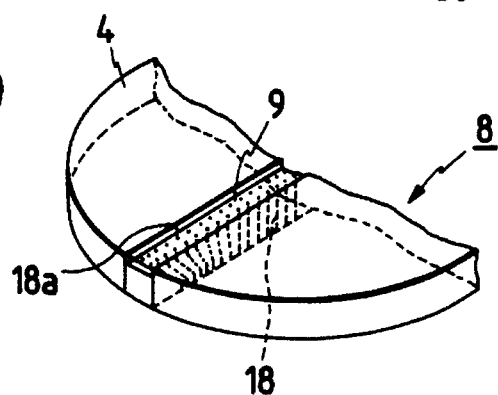
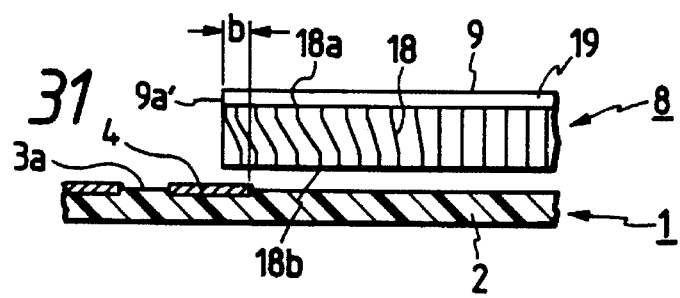
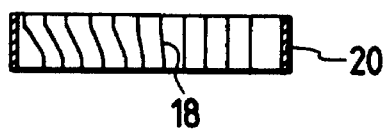

CAR-CARRIED INDICATING DEVICE

BACKGROUND OF THE INVENTION

The present invention relates to a car-carried indicating device of the type in which light transmitted through a transparent portion of a needle plate, rotated by a meter internal unit, is used as a needle.

An analog meter of a self-illumination type has been known as a car-carried indicating device for transferring drive information, such as running speed, to a driver. In this type of the analog meter, a linear transparent part is formed in a disc-like needle plate, which is rotated by an internal unit for meter. A linear form of light transmitted through the transparent part is used as a needle.

Referring to FIGS. 43 to 46, there are shown conventional car-carried indicating devices of this type. A character plate 1 as a light diffusion plate is mounted on a meter case installed in a dash board of a motor vehicle. The character plate 1 contains a transparent portion 2, substantially circular in shape, at the location for display. A series of numerals 3a is circularly arrayed around the transparent portion 2, and further a scale 3b is circularly arrayed outside the series of numerals. An opaque layer 4 of black, for example is layered on the upper surface of the character plate 1, except the transparent portion 2, the numerals 3a and the scale 3b. A center hole 5 is formed at the center of the transparent portion 2. A rotating shaft 7 of the internal unit of the cross coil type, which is driven in accordance with given measuring quantities, passes through the center hole 5.

A disc-like needle plate 8 is disposed on the front side of the character plate 1. The needle plate 8 is made of transparent material, such as acryl and polycarbonate. The diameter of the needle plate 8 is slightly larger than that of the transparent portion 2. The rotating shaft 7 is connected to the needle plate 8. A transparent slit 9 is formed in the needle plate 8. The slit 9 serves as a needle extending radially from the center. The opaque layer 4 is also formed on the upper surface of the needle plate 8 except the slit 9. On the rear side of the character plate 1, a cold cathode tube 10 as a light source is disposed around the internal unit 6. The cold cathode tube 10 is shaped circular.

In the car-carried indicating device thus constructed, the cold cathode tube 10, when lit on, illuminates the rear side of the character plate 1. Light passes through the transparent portion 2 to illuminate the rear side of the needle plate 8. With the back-light, the numerals 3a, the scale 3b, and the slit 9 emit light. Under this condition, the internal unit 6 is driven in accordance with determinate measuring quantities, so that the needle plate 8 is turned and the slit 9 points to corresponding positions on the numerals 3a and scale 3b. In this way, the analog indication is performed.

As shown in FIG. 46, the needle plate 8 is slightly larger than the transparent portion 2 of the character plate 1. The circumferential edge part 8a of the-needle plate 8 overlaps with the circumferential edge part 2a of the transparent portion 2. Otherwise, when a driver turns his eyes off the front position, he will see the transparent portion 2 through a gap a between the character plate 1 and the needle plate 8.

Where the character plate 1 and the needle plate 8 overlap, the distal end part 9a of the slit 9, because of presence of the overlapping part b, emits an insufficient quantity of light; otherwise it should emit light by the back-light. As a result, it loses its clear presentation. To cope with this, the opaque layer 4 is formed on the upper surface of the distal end part 9a.

Formation of the opaque layer 4 on the distal end part 9a reduces the length of the slit 9 emitting light. In other words, as shown in FIG. 44, it increases the space between the tip 9a' of the slit 9 and the numerals 3a. As a result, the driver cannot clearly perceive the needle and its indication. Thus, the readability of the indicating device is deteriorated.

With reduction of the slit length, the driver will mistakenly perceive the indicating device smaller than the actual one. This leads to impairment of the value of commodity.

SUMMARY OF THE INVENTION

Accordingly, an object of the present invention is to provide a car-carried indicating device which presents a clear indication by the needle and an improved readability, and is constructed so as to look larger than the actual one, whereby its commodity value is improved.

To achieve the above object, there is provided a car-carried indicating device according to a first aspect of the present invention including a character plate having a substantially circular transparent portion at the indicating position, transparent numerals and a scale being circularly arrayed around the transparent portion, a disk-like needle plate, driven to turn in accordance with given measuring quantities, having a transparent slit-like needle shining when it receives back-light, the needle plate being disposed on the front side of the character plate, and a light source located on the rear side of the character plate, the indicating device being improved in that the needle plate is made of base material having light diffusion nature, and the slit extends up to the circumferential edge of the needle plate.

In the car-carried indicating device thus constructed, light gathering means is formed on the underside of the needle plate, which is located corresponding to the slit.

In the indicating device, a bundle of optical fibers is set in the needle plate in a sealing manner, the slit is extended up to the circumferential outer edge of the needle plate, the light emitting end faces of the bundle of optical fibers are located within the slit, and the light receiving end faces of the bundle of optical fibers face the transparent portion.

The slit on the needle plate is extended up to the circumferential outer edge of the needle plate, and a prism film is disposed on the rear side of the needle plate at a location corresponding to the slit formed thereon, and when light is incident the prism film at a preset angle, the prism film emits the light of a preset directivity.

An indicator protrusion is protruded, along the slit, from the circumferential edge of the needle plate till it overlaps with the numerals and the scale, and the slit reaches the tip of the indication protrusion.

As described above, in the car-carried indicating device of the invention, the needle plate is made of light diffusion base material, and the slit as a needle, which emits light when it receives back-light, is extended up to the circumferential outer edge of the needle plate. When the circumferential outer edge of the needle plate overlaps with the opaque layer part on the character plate and the lapping part is illuminated with insufficient amount of light, the slit shines uniformly over its entire length from the base end to the distal end, without any influence by the overlapping part. A clear indication by the needle and a good readability are secured. With use of such needle 9, the indicating device looks larger than the actual one, leading to improvement of the valid of commodity.

Since light gathering means is formed on the underside of the needle plate, which is located corresponding to the slit, the slit shines at a high brightness over its entire length.

Further, a bundle of optical fibers is set in the needle plate in a sealing manner, the slit is extended up to the circumferential outer edge of the needle plate, the light emitting end faces of the bundle of optical fibers are located within the slit, and the light receiving end faces of the bundle of optical fibers face the transparent portion. Accordingly, with the light emitted from the optical fibers, the slit shines at a uniform illumination intensity over the range from the base end to the top. The resultant needle is long.

The slit on the needle plate is extended up to the circumferential outer edge of the needle plate, and a prism film is disposed on the rear side of the needle plate at a location corresponding to the slit formed thereon, and when light is incident the prism film at a preset angle, the prism film emits the light of a preset directivity. With such a construction, light enters, propagates through and emanates from the prism film at a preset angle to the needle plate. With the light emitted from the optical fibers, the slit shines at a uniform illumination intensity over the range from the base end to the top.

An indicator protrusion is protruded, along the slit, from the circumferential edge of the needle plate till it overlaps with the numerals and the scale, and the slit reaches the tip of the indication protrusion. The slit or needle shining at a uniform brightness over its entire length overlaps with the numerals and the scale. This provides a clear indication by the needle.

Further, an object of the second aspect of the present invention is to provide a car-carried indicating device in which the needle becomes bright uniformly over the entire length including the distal end thereof, using improved material for the needle plate.

To achieve the above object, there is provided a car-carried indicating device according to the second aspect including a character plate having a circular transparent portion at the center, transparent numerals and a scale being circularly arrayed around the transparent portion, a disk-like needle plate having a transparent slit-like needle, the needle plate being disposed on the front side of the character plate, and a light source, located on the rear side of the character plate, for illuminating the numerals and the scale on the character plate and the needle of the needle plate, the improvement in which at least said needle of said needle plate is made of fluorescent material, and the light gathering wavelength characteristics of fluorescent dye constituting the fluorescent material are set to be substantially equal to the peak wavelength in the spectral characteristics representing a variation of luminance intensity of said light source.

In the car-carried indicating device, the peak wavelength in the spectral characteristics representing a variation of luminance intensity of said light source is selected such that the luminance wavelength of said fluorescent dye is positioned at the peak of the relative luminous efficiency curve of the human being.

In the car-carried indicating device according to the second aspect of the present invention thus constructed, when the light source is turned on, the needle plate 18 effectively emits light since the light gathering wavelength characteristics of fluorescent dye constituting the fluorescent material are set to be substantially equal to the peak wavelength in the spectral characteristics representing a variation of luminance intensity of said light source. As a result, the needle becomes bright uniformly over the entire length including the distal end thereof. When the luminance wavelength of said fluorescent dye is positioned at the peak of the relative luminous efficiency curve of the human being, the driver will perceive the needle as if it becomes brighter.

BRIEF DESCRIPTION OF THE DRAWINGS

FIG. 28 is a perspective view showing a light gathering portion of the needle plate shown in FIG. 27.

FIG. 29 is a view showing the rear side of the light gathering portion shown in FIG. 27.

FIG. 30 is a perspective view showing a part of the needle plate according to a fifth embodiment of the present invention.

FIG. 31 is a cross sectional view showing a key portion of the needle plate shown in FIG. 30.

FIG. 32 is a view showing a bundle of optical fibers.

FIG. 33 is a view showing a bundle of optical fibers firmly set in the case.

DETAILED DESCRIPTION OF THE PREFERRED EMBODIMENTS

Figure 1:
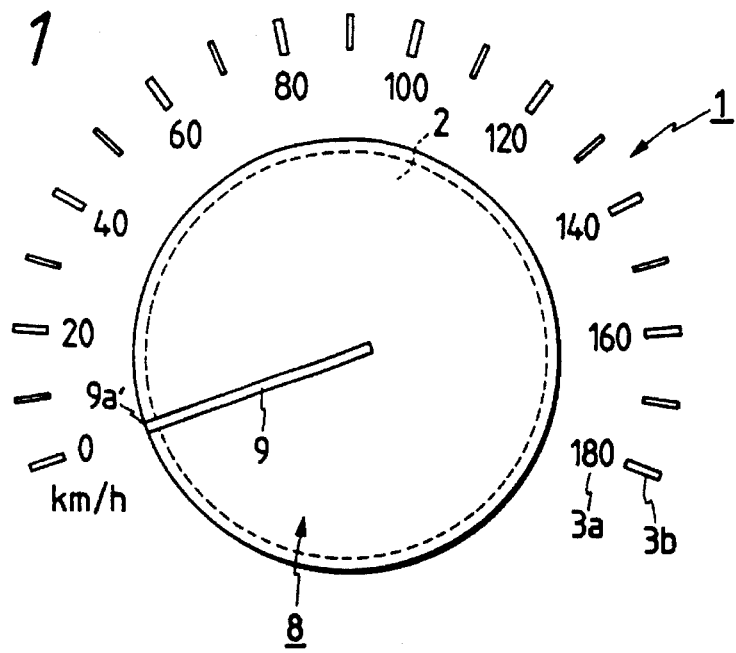
FIG. 1 is a front view showing a car-carried indicating device according to a first embodiment of the present invention.
Figure 2:
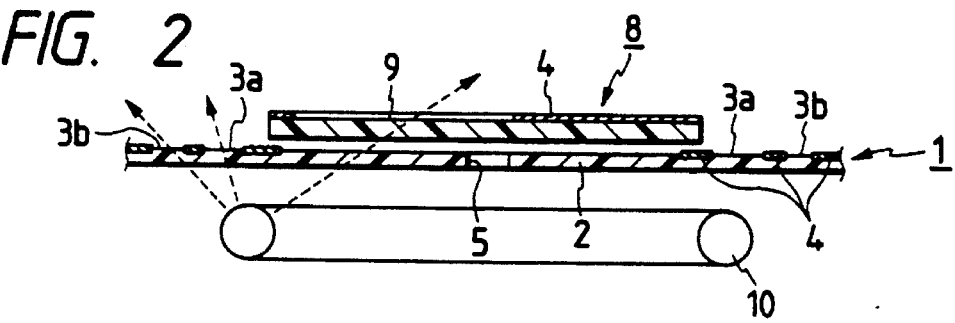
FIG. 2 is a cross sectional view of the car-carried indicating device of FIG. 1.
Figure 3:
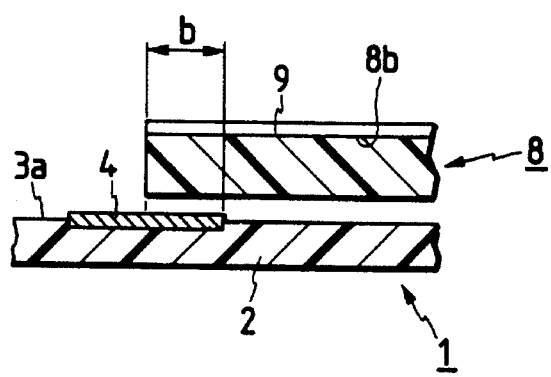
FIG. 3 is a cross sectional view showing a key portion of the car-carried indicating device shown in FIG. 2.
Figure 4:
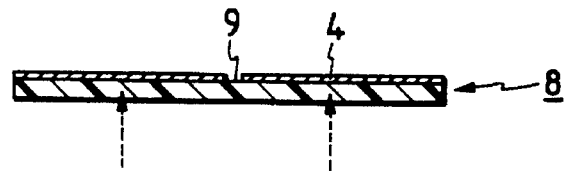
FIG. 4 is a cross sectional view showing the needle plate in the indicating device of FIG. 1.

Preferred embodiments of the present invention will be described with reference to FIGS. 1 through 42.

In FIGS. 1 to 4 showing a first embodiment of a car-carried indicating device according to the present invention, a character plate 1 as a light diffusion plate is mounted on a meter case installed in a dash board of a motor vehicle. The character plate 1 contains a transparent portion 2, substantially circular in shape, at the location for display. A series of numerals 3a is circularly arrayed around the transparent portion 2, and further a scale 3b is circularly arrayed outside the series of numerals. An opaque layer 4 of black, for example is layered on the upper surface of the character plate 1, except the transparent portion 2, the numerals 3a and the scale 3b. A center hole 5 is formed at the center of the transparent portion 2. A rotating shaft 7 of the internal unit of the cross coil type, which is driven in accordance with given measuring quantities, passes through the center hole 5.

A disc-like needle plate 8 is disposed on the front side of the character plate 1. The needle plate 8 is slightly larger than that of the transparent portion 2. The rotating shaft (not shown) is connected to the needle plate 8. On the rear side of the character plate 1, a cold cathode tube 10 as a light source is disposed around the internal unit 6. The cold cathode tube 10 is shaped circular. In this embodiment, the needle plate 8 is made of fluorescent material as a light diffusion base material consisting of mixture of transparent resin and predetermined fluorescent dye. The opaque layer 4 is also formed on the upper surface of the needle plate 8 except the slit 9 as a needle extending from the center to the circumferential edge.

The operation of the present embodiment will be described. In the car-carried indicating device thus constructed, the cold cathode tube 10, when lit on, illuminates the rear side of the character plate 1. Light passes through the transparent portion 2 to illuminate the rear side of the needle plate 8. With the back-light, the numerals 3a, the scale 3b, and the slit 9 emit light. Under this condition, the internal unit 6 is driven in accordance with determinate measuring quantities, so that the needle plate 8 is turned and the slit 9 points to corresponding positions on the numerals 3a and scale 3b. In this way, the analog indication is performed.

In the present embodiment where the needle plate 8 is made of predetermined fluorescent material, light that is emitted by the light source 10 passes through the transparent portion 2, and illuminates the rear side of the needle plate 8. The light is introduced into the needle plate 8. The fluorescent dye of the fluorescent material transforms the introduced light into fluorescence. As a result, it is emitted again in the form of fluorescence of long wavelengths. Most of the fluorescence propagates through the needle plate 8 while repeating the total reflection and the diffuse reflection at the boundary 8b between the inside and the outside of the needle plate 8.

Even in such a case where the slit 9 extends up to the circumferential outer edge of the needle plate 8, and the outer end part of the needle plate 8 overlaps with the opaque layer 4 on the character plate 1, and the overlapping part b is unsatisfactorily illuminated with back-light, the fluorescence propagates within the needle plate 8 while repeating the diffuse reflection, being unaffected by the overlapping part b, and emanates from the slit 9. As a result, the slit 9 shines at a uniform intensity over its entire length. Accordingly, a sufficient luminance intensity is distributed uniformly over the slit ranging entirely from the base end to the distal end. The resultant slit or needle 9 is long. The tip 9a' of the slit 9 is set close to the numerals 3a, whereby a clear indication by the needle and a good readability are secured. With use of the long slit or needle 9, the indicating device looks larger than the actual one, leading to improvement of the valid of commodity.

Figure 5:
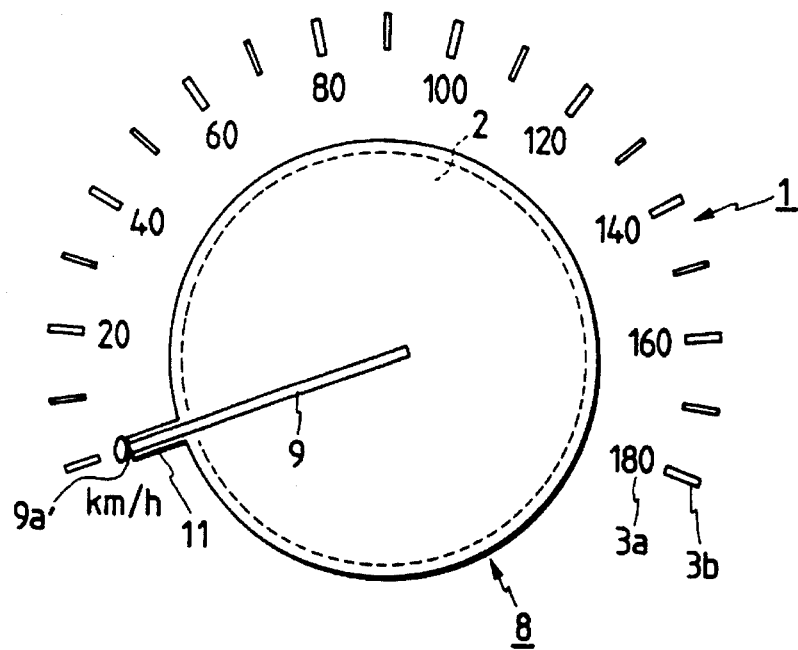
FIG. 5 is a front view showing a car-carried indicating device according to a second embodiment of the present invention.
Figure 6:
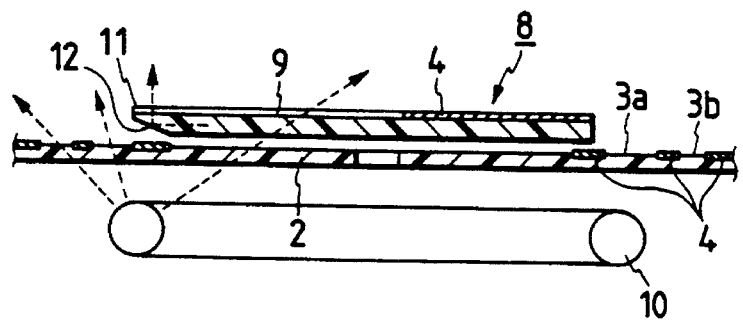
FIG. 6 is a cross sectional view of the car-carried indicating device of FIG. 5.
Figure 7:
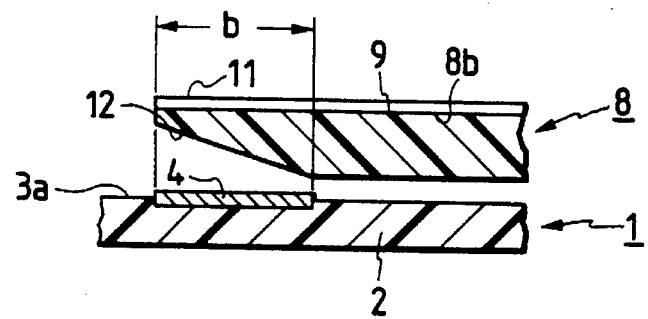
FIG. 7 is a cross sectional view showing a key portion of the car-carried indicating device shown in FIG. 6.

FIGS. 5 to 7 cooperate to show a second embodiment of the present invention. The needle plate 8 has the same construction as that of the embodiment as mentioned above. A protrusion 11 is integral with the needle plate 8 in a state that it is protruded, along the slit 9, from the circumferential edge of the needle plate 8. Specifically, the protrusion 11 has the thickness equal to that of the needle plate 8, and is extended along the slit 9 till it overlaps with the numerals 3a and the scale 3b. The upper face of the protrusion 11 is covered with the opaque layer 4 so that the slit 9 reaches the tip of the protrusion 11. A tapered part 12 is tapered upward from the lower side of the needle plate 8 to the upper side at the distal end part of the protrusion 11.

Also in this embodiment, the needle plate 8 and the protrusion 11 are made of predetermined fluorescent material. Accordingly, the light introduced into the needle plate 8 is transformed into fluorescence by the fluorescent material. It is emitted again as fluorescence of long wavelengths. Most of the emitted fluorescence propagates within the needle plate 8, repeating reflections at the boundary 8b, and further within the protrusion 11. With the fluorescence propagating within the needle plate 8 and the protrusion 11 while repeating diffuse reflection, the slit 9 shines. The fluorescence progressively attenuates before it reaches the tip of the protrusion 11. It is noted here that the tapered part 12 reflects the attenuated fluorescence at substantially 90° to turn it toward the slit 9. The action of the tapered part 12 prevents the tip of the slit 9 from becoming dark. In other words, the slit 9 shines at a uniform intensity over its entire length.

As described above, the slit 9 as a needle is extensively formed on the protrusion 11, which is integral with the needle plate 8, and is extended to overlap with the numerals 3a and the scale 3b. Even in a case where the protrusion 11 overlaps with the opaque layer 4 on the character plate 1, the slit 9 shines at a uniform intensity over its entire length, with the fluorescence propagating within the needle plate 8 and the protrusion 11 while repeating diffuse reflection. Accordingly, the slit or needle 9 is uniformly bright in the entire range from the base end of the needle to the distal end. Since the tip 9a' of the needle 9 overlaps with the numerals 3a, the driver can exactly recognize, by his eyes, the position pointed by the needle 9. In this respect, the visual recognition and readability of the indicating device are improved. Since the needle 9 is sufficiently long, the indicating device looks larger than the actual one, as a whole, improving the valid of its commodity.

Figure 8:
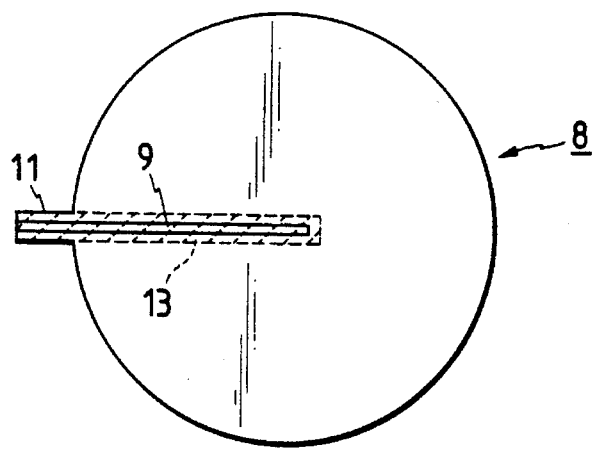
FIG. 8 is a front view showing a modification of the second embodiment of FIG. 5.
Figure 9:
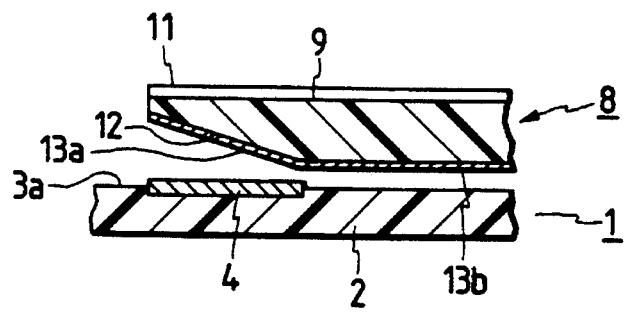
FIG. 9 is a cross sectional view showing a key portion of the car-carried indicating device shown in FIG. 8.

A modification of the second embodiment is shown in FIGS. 8 and 9. In this instance of the embodiment, a hot stamp 13, transparent and white in color, is formed on the under side of the portion of the needle plate and the protrusion 11 where the needle 9 is formed.

The stamp part 13a of the hot stamp 13, which extends over the tapered part 12 of the protrusion 11, functions to improve the reflection efficiency for the fluorescence, which is caused by the introduced light, to be reflected by the tapered part 12. The stamp part 13b layered on the underside of the needle plate 8, which faces the transparent portion 2 of the character plate 1, functions to soften the light, which is introduced into the needle plate 8 through the transparent portion 2. With provision of the hot stamp 13 including the stamp parts 13a and 13b, the slit 9 shines uniformly over its entire length.

Figure 10:
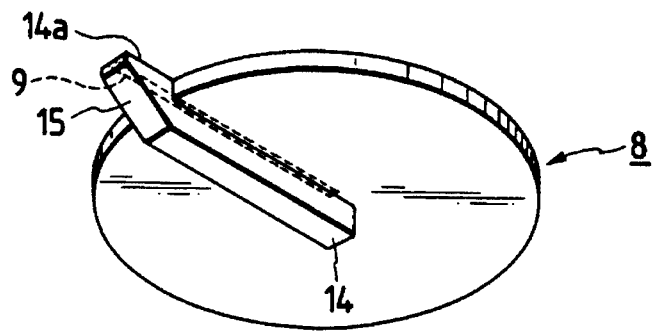
FIG. 10 is a perspective view showing a needle plate according to a third embodiment of the present invention.

A third embodiment of the present invention will be described with reference to FIGS. 10 and 11.

As in the third embodiments as mentioned above, the needle plate 8 is made of predetermined fluorescent material and the opaque layer 4 is formed on the upper side of the needle plate 8 except the needle 9. A bar-like protrusion 14 as light gathering means is integrally formed on the radially extending narrow portion of the underside of the needle plate 8, which corresponds to the slit 9 formed on the upper side thereof. The distal end part 14a of the bar-like protrusion 14 is protruded from the circumferential outer edge of the needle plate 8. The opaque layer 4 is formed over the upper face of the distal end part of the bar-like protrusion 14 so as to extend thereover. A tapered part 15 is tapered upward from a lower side of the protrusion 14 to the upper side at the distal end part 14a of the protrusion 14.

Also in this embodiment, the needle plate 8 and the protrusion 14 are made of predetermined fluorescent material. Accordingly, the light introduced into the needle plate 8 is transformed into fluorescence by the fluorescent material. It is emitted again as fluorescence of long wavelengths. Most of the emitted fluorescence propagates within the needle plate 8, repeating reflections at the boundary 8b of the needle plate 8, and further within the protrusion 14, repeating reflections at the boundary 14b of the bar-like protrusion 14. The fluorescence reaches the distal end part 14a of the bar-like protrusion 14 and is reflected by the tapered part 15.

Accordingly, the slit or needle 9 is uniformly bright in the entire range from the base end of the needle to the distal end. Since the tip of the needle 9 overlaps with the numerals, the driver can exactly recognize, by his eyes, the position pointed by the needle 9.

Figure 11:
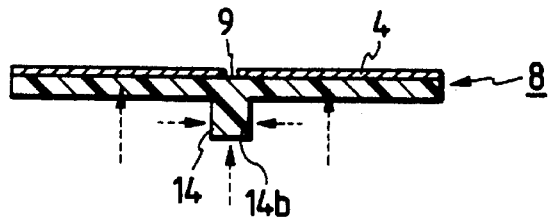
FIG. 11 is a cross sectional view showing the needle plate of FIG. 10.
Figure 12:
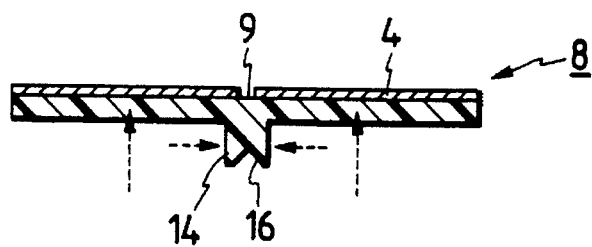
FIG. 12 is a cross sectional view showing a first modification of the needle plate shown in FIG. 10.

As seen from FIG. 11, light from the light source is introduced from both sides of the bar-like protrusion 14 and the lower side thereof as well, into the bar-like protrusion 14. Thus, the light receiving area is increased, so that the quantity of fluorescence propagating within the bar-like protrusion 14 increases, and the slit 9 emits more intensive light. Accordingly, the driver can clearly perceive the indication by the needle 9.

A first modification of the third embodiment as mentioned above is shown in FIG. 12. As shown, a V-shaped groove 16 is formed in the underside of the bar-like protrusion 14. The light introduced from both sides of the bar-like protrusion 14 is reflected by the V-shaped groove 16 and guided into the needle 9. As a result, the light emitted from the needle 9 is more intensive.

Figure 13:
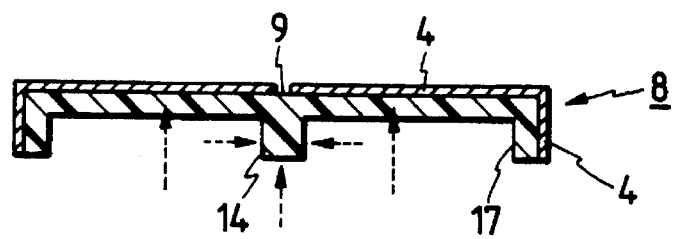
FIG. 13 is a cross sectional view showing a second modification of the needle plate shown in FIG. 10.

A second modification of the third embodiment is shown in FIG. 13. As shown, a wall 17 is formed around the circumferential outer edge of the needle plate 8. The outer surface of the wall 17 is also covered with the opaque layer 4.

With provision of the wall 17, when the driver turns his eyes off the front position, he cannot see the transparent portion through the gap between the character plate and the needle plate 8. Further, no light leaks outside from the circumferential outer edge of the needle plate 8.

Figure 14:
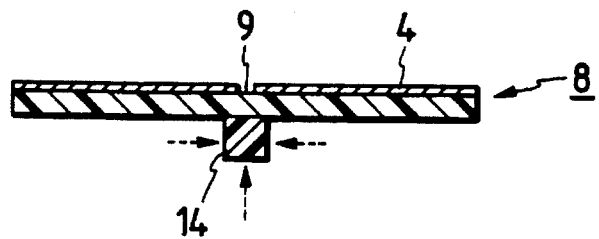
FIG. 14 is a cross sectional view showing a third modification of the needle plate shown in FIG. 10.
Figure 15:
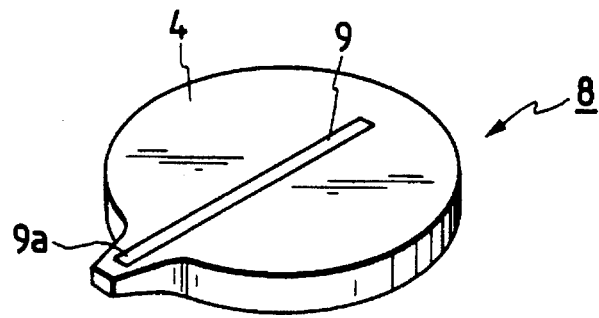
FIG. 15 is a perspective view showing the upper side of fourth embodiment of the invention.
Figure 16:
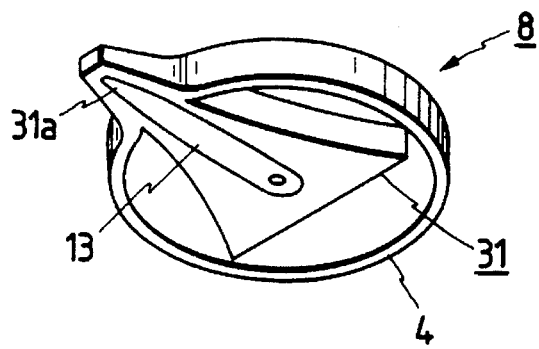
FIG. 16 is a perspective view showing the rear side of the fourth embodiment of the invention shown in FIG. 15.
Figure 17:
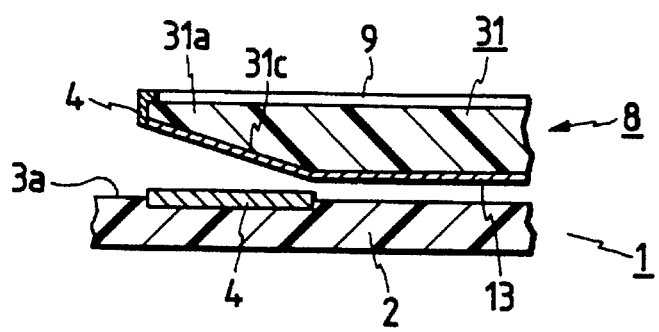
FIG. 17 is a cross sectional view showing the distal end part of the slit of the needle plate shown in FIG. 15.
Figure 18:
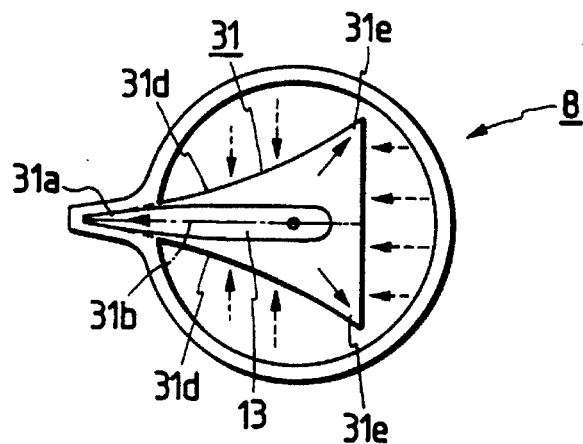
FIG. 18 is a view showing the rear side of the needle plate, useful in explaining a light gathering state of the needle plate shown in FIG. 15.
Figure 19:
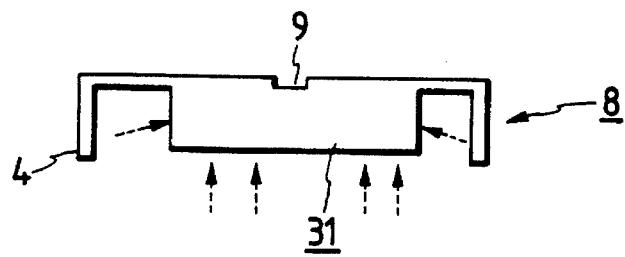
FIG. 19 is a cross sectional view showing the needle plate shown in FIG. 15.

A third modification of the third embodiment shown in FIG. 14. As shown, the needle plate 8 and the bar-like protrusion 14 are separately formed, both being made of fluorescent material.

Also with the structure, the fluorescence, which is caused by the introduced light and propagates within the bar-like protrusion 14, causes the slit 9 to shine more intensively. The resultant needle (corresponding to slit 9) clearly points to the numerals on the scale.

A fourth embodiment of the present invention will be described with reference to FIGS. 15 through 19.

As in the fourth embodiments, the needle plate 8 is made of predetermined fluorescent material and the opaque layer 4 is formed on the upper side of the needle plate 8 except the needle 9. As shown, the needle plate 8 is shaped to have a protrusion on which the distal end part 9a of the slit or needle 9 is located. Accordingly, the slit or needle 9 extends beyond the needle plate 8. The circumferential outer edge of the needle plate 8 entirely extends downward to form a circular wall in cross section. A light gathering portion 31 shaped like an isosceles triangle protrudes from the underside of the needle plate 8 in a one-piece construction. The vertex of angle of the light gathering portion 31 lies under the distal end part 9a of the needle 9. A bisector 31b thereof lies right under the needle 9. A tapered part 31c, formed on the portion of the vertex angle 31a of the light gathering portion 31, is gradually raised from the underside of the needle plate 8 to the upper side. A bar-like protrusion 14 as light gathering means is integrally formed on the radially extending narrow portion of the underside of the needle plate 8, which corresponds to the slit 9 formed on the upper side thereof. The distal end part 14a of the bar-like protrusion 14 is protruded from the circumferential outer edge of the needle plate 8. The opaque layer 4 is formed over the upper face of the distal end part of the bar-like protrusion 14 so as to extend thereover. A tapered part 15 is tapered upward from the lower side of the needle plate 8 to the upper side at the distal end part 14a of the protrusion 14. The side of the isosceles triangle 31d are curved inwardly. The hot stamp 13 is formed on the underside of the light gathering portion 31 in the elongated portion corresponding to the slit 9.

In this embodiment, light is introduced into the light gathering portion 31 through the light receiving surface including the underside and the side faces of the light gathering portion 31. The introduced light is also transformed into fluorescence and emitted again as fluorescence having long wavelengths. The fluorescence received by the broad light receiving surface propagates while reflecting the isosceles 31d as boundaries between the inside and the outside of the light gathering portion 31, so that the fluorescence is concentrated at the portions of the vertex angle 31a and the base angles 31e and 32e. With the fluorescence propagating within the light gathering portion 31 while repeating the reflection, the slit 9 of the needle plate 8 shines. The fluorescence is concentrated particularly at the portion of the vertex angle 31a, viz., the distal end part 9a of the slit 9 where the fluorescence otherwise is greatly attenuated. Accordingly, the needle 9 shines at a uniform intensity over its entire length. The resultant needle 9 is excellent in the visual recognition and the value of commodity.

Figure 20:
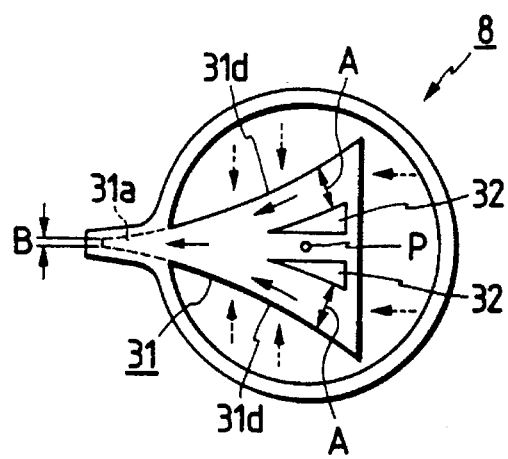
FIG. 20 is a view showing the rear side of the needle plate of a first modification of the needle plate according to the fourth embodiment shown in FIG. 15.
Figure 21:
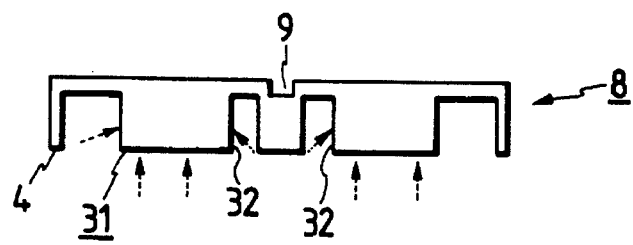
FIG. 21 is a cross sectional view showing the needle plate shown in FIG. 20.
Figure 22:
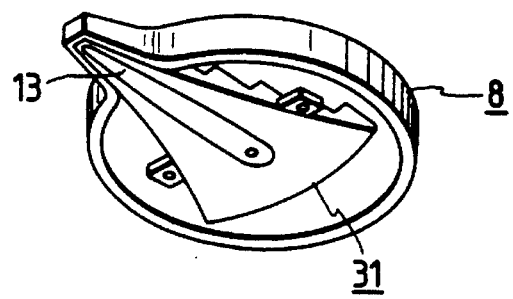
FIG. 22 is a perspective view showing the rear side of second modification of the fourth embodiment of the invention shown in FIG. 15.
Figure 23:
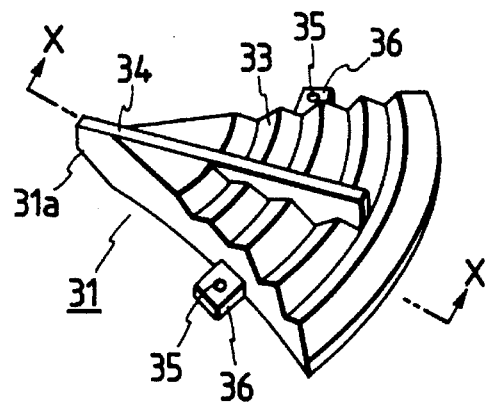
FIG. 23 is a perspective view showing a light gathering portion of the needle plate shown in FIG. 22.
Figure 24:
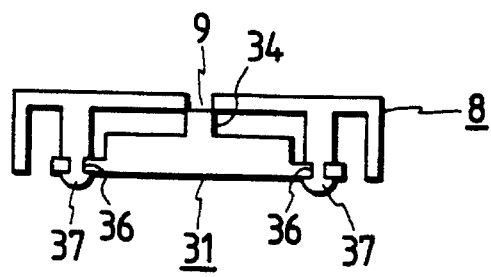
FIG. 24 is a cross sectional view showing the needle plate shown in FIG. 22.
Figure 25:
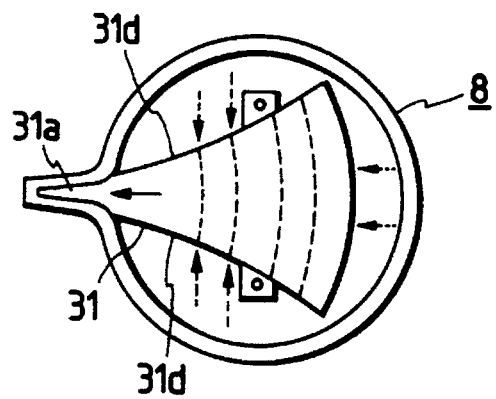
FIG. 25 is a view showing the rear side of the needle plate, useful in explaining a light gathering state of the needle plate shown in FIG. 22.
Figure 26:
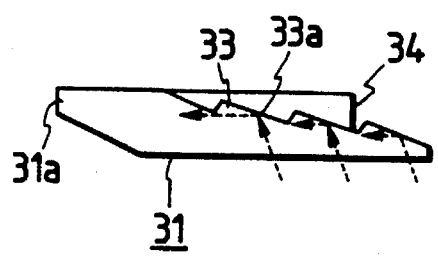
FIG. 26 is a cross sectional view taken in the direction of arrows along a line X—X of FIG. 23.
Figure 27:
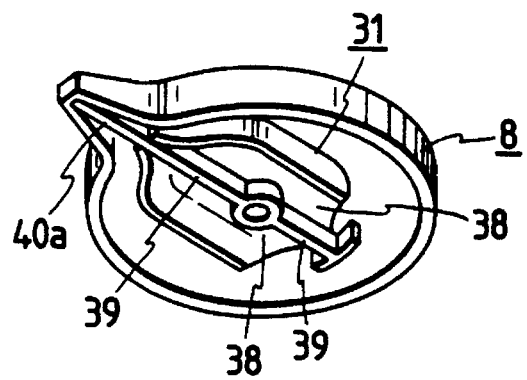
FIG. 27 is a perspective view showing the rear side of a third modification of the fourth embodiment of the invention shown in FIG. 15.

A first modification of the fourth embodiment will be described with reference to FIGS. 20 and 21. The modification is improved in that the needle plate 8 with the light gathering portion 31 is reduced in weight. To this end, holes 32 and 32 each similar to the figure gained by bisecting the light gathering portion 31 are formed on both sides of the center of gravity denoted as P of the light gathering portion 31.

With the structure as just mentioned, the weight of the needle plate 8 is reduced as a whole. The load of the drive source for driving the needle plate 8 is further reduced.

In the light gathering portion 31 having the holes 32, the adverse affect by the holes 32 on the light gathering characteristics of the light gathering portion 31 can be eliminated if the width A of the portion for guiding the fluorescence caused by the light gathered by the light gathering portion 31 is sufficiently larger than the width B of the portion of the vertex angle 31a (approximately five times). If those widths A and B are so selected, the distal end part of the needle 9 shines at a satisfactorily high intensity, ensuring a uniform intensity of light over the entire length of the slit 9.

In the above-mentioned embodiments, the light gathering portion 31 is integral with the needle plate 8. If required, those may be formed separately, and are coupled with each other by suitable bonding means. In a modification of this instance, only the light gathering portion 31 is made of determined fluorescent material. It is mounted on a cap-like needle plate 8 with a slit 9 of which the surface is masked.

A second modification of the fourth embodiment is illustrated in FIGS. 22 through 26. The present modification is presented for improving the light gathering performance of the light gathering portion 31.

A light gathering portion 31 shaped like an isosceles triangle is disposed on the underside of the cap-like needle plate 8 having a slit 9 of which the surface is masked. The light gathering portion 31 is made of the fluorescent material, and is not integral with the needle plate 8. A plural number of sawtooth 33 each shaped like an wedge in cross section are formed, on the upper surface of the light gathering portion 31 in a manner that the thickness is gradually reduced from the vertex angle 31a of the light gathering portion to the outer edge. When seen from top, those sawtooth are arrayed concentrically with respect to the vertex angle 31a portion. An upright portion 34 extends along the slit 9 as shown. Flanges 36 and 36 with positioning holes 35 are formed on both sides of the light gathering portion 31. Pins 37 erecting on the underside of the needle plate 8 are inserted into the positioning holes 35 of the flanges 36, respectively. At this time, the upper face of the upright portion 34 is positioned right under the upright portion 34. In this state, the pins 37 projected from the positioning holes 35 are thermally welded to fix the light gathering portion 31 to the underside of the needle plate 8.

Also in this embodiment, light introduced into the light gathering portion 31 is transformed into fluorescence and emitted again as fluorescence having long wavelengths. The fluorescence received by the broad light receiving surface propagates while reflecting the isosceles 31d as boundaries between the inside and the outside of the light gathering portion 31, and the tapered parts 33a of the sawtooth 33. As a result, the fluorescence is concentrated at the portion of the vertex angle 31a. With the fluorescence propagating within the light gathering portion, the upright portion 34 as the needle 9 shines. The fluorescence is concentrated particularly at the portion of the vertex angle 31a, viz., the distal end part 9a of the slit 9 where the fluorescence otherwise is greatly attenuated. Accordingly, the needle 9 shines at a uniform intensity over its entire length. The resultant needle 9 is excellent in the visual recognition and the value of commodity.

A third modification of the embodiment as mentioned above will be described with reference to FIGS. 27 through 29. This modification also enhances the light collecting performance of the light gathering portion 31.

A light gathering portion 31 is mounted, by means of fixing means (not shown), on the underside of the cap-like needle plate 8 having a slit 9 of which the surface is masked. The light gathering portion 31 is made of the fluorescent material, and is not integral with the needle plate 8. The light gathering portion 31 contains curved surface portions 38 partially forming a spherical surface. On the rear side of the light gathering portion 31, a bar-like protrusion 39 divides the spherical rear side into the curved surface portions 38. On the spherical obverse side of light gathering portion 31, an upright portion 40 as the needle linearly runs along the bar-like protrusion 39 on the rear side. The upright portion 40 is located right under the slit. A part of the upright portion 40 is extended outward from the light gathering portion including the curved surface portions 38. This extended part constitutes a distal end part 40a of the upright portion 40.

In this instance of the embodiment, the light illuminating the rear side of the needle plate 8 illuminates the rear side of the light gathering portion 31. The light is introduced into the light gathering portion 31, through the curved surface portions 38 and the bar-like protrusion 39, and transformed into fluorescence. It is emitted again as fluorescence of long wavelengths. The fluorescence, caused by the light received by the bar-like protrusion 39, propagates in a manner that it is repeatedly reflected at the boundaries between the inside and the outside of the bar-like protrusion 39, and reaches the upright portion 40 as the needle. The fluorescence, caused by the light received by the curved surface portions 38, is guided while being reflected by the interfaces of the curved surface portions 38 and R-parts 38a and 38b thereof, into the distal end part 40a of the upright portion 40. With the fluorescence reflected and guided by the light gathering portion 31, the upright portion 40 as the needle and the distal end part 40a of the upright portion 40 shine. Particularly the distal end part 40a is sufficiently bright with the fluorescence guided by the R-parts 38a and 38b; otherwise it receives greatly attenuated fluorescence. The needle shines at a sufficiently brightness distributed over its full length. The resultant needle plate is satisfactory in the visual recognition and the value of its commodity.

A fifth embodiment of the present invention will be described with reference to FIGS. 30 to 33. In the present embodiment, unlike the embodiments as mentioned above, the needle plate 8 is made of transparent material as in the conventional device, while in the embodiments as mentioned embodiment, it is made of fluorescent material as base material. A number of optical fibers 18 are buried in the needle plate 8.

The needle plate 8 has a diameter slightly larger than the transparent portion 2 of the character plate 1. The opaque layer 4 is layered over the character plate 1, except the transparent portion 2, the numerals 3a, and the scale. A slit 9 as a needle radially extends from the center of the needle plate 8 to its circumferential outer edge. A number of optical fibers 18 are buried in the slit 9. The light emitting end faces 18a of the optical fibers 18 are uniformly arrayed within the slit 9. The light receiving end faces 18b of the optical fibers 18 are uniformly arrayed in the light receiving surface of the needle plate 8, which faces the transparent portion 2. A light diffusion plate 19 is located on the upper surface of the needle 9.

There are many possibly ways to firmly set optical fibers in the slit 9. In the first way, a bundle of optical fibers 18, intentionally shaped as shown in FIG. 32, is set at a location where the slit 9 is to be located, in a mold shaped like the needle plate 8. And acryl resin is poured into the mold. In the second way, a needle plate 8 with a space for the slit 9 is prepared. A bundle of optical fibers 18, intentionally shaped, is set in the space, and then is sealed with epoxy resin. In the third way, a case 20 having optical fibers 18 enclosed therein, as shown in FIG. 33, is inserted into the space.

In the present embodiment, the rear side of the needle plate 8 is illuminated with light from the light source. The light is introduced from the light receiving end faces 18b of the optical fibers 18, located at the light receiving face of the needle plate 8, into the optical fibers 18. The introduced light propagates within the optical fibers 18 while repeating the total reflection therein, and emits from the light emitting end faces 18a. The emitted light is diffused by the diffusion plate 19, so that the slit 9 of the needle plate 8 shines uniformly over its full length.

Even in such a case where the slit 9 extends up to the circumferential outer edge of the needle plate 8, and the outer end part of the needle plate 8 overlaps with the opaque layer on the character plate 1, and the overlapping part b is unsatisfactorily illuminated with back-light, the slit 9 shines uniformly over its entire length since the light emitting end faces 18a of the optical fibers 18 are uniformly arrayed within the slit 9. Accordingly, a sufficient luminance intensity is distributed uniformly over the slit ranging entirely from the base end to the distal end. The resultant slit or needle 9 is long. The tip 9a' of the slit 9 is set close to the numerals 3a, whereby a clear indication by the needle and a good readability are secured. With use of the long slit or needle 9, the indicating device looks larger than the actual one, leading to improvement of the valid of commodity.

Figure 34:
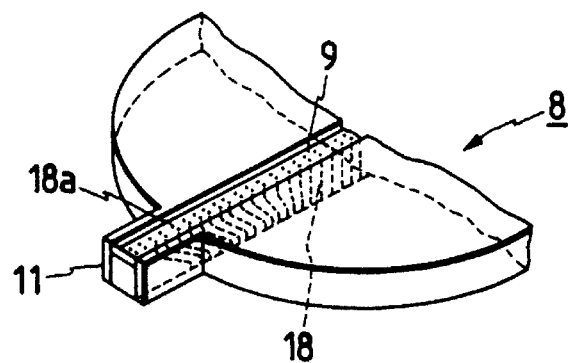
FIG. 34 is a perspective view showing a needle plate according to a sixth embodiment of the present invention.
Figure 35:
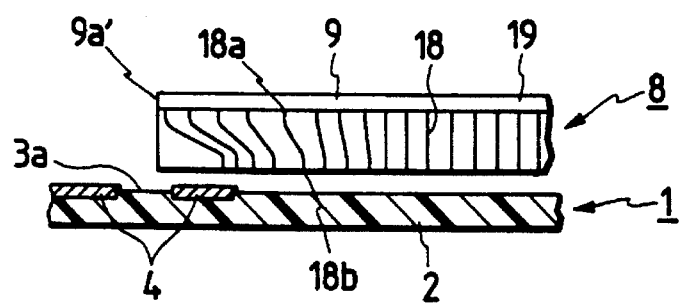
FIG. 35 is a cross sectional view showing a key portion of the sixth embodiment of FIG. 34.

A sixth embodiment of the present invention will be described with reference to FIGS. 34 and 35. The needle plate 8 has the same construction as that of the embodiment as mentioned above. An indicator protrusion 11 is protruded, along the slit 9, from the circumferential edge of the needle plate 8. Specifically, the protrusion 11 is extended along the slit 9 till it overlaps with the numerals 3a and the scale 3b. Also within the slit 9, the light emitting end faces 18a of the optical fibers 18 are uniformly disposed. The light receiving end faces 18b of the optical fibers 18 are disposed in the light receiving face of the needle plate 8, which faces the transparent portion 2.

As described above, the slit 9 as a needle is extensively formed on the protrusion 11, which is extended to overlap with the numerals 3a and the scale 3b. With the light emitting from the optical fibers 18 uniformly arrayed within the slit 9, the slit or needle 9 is uniformly bright in the entire range from the base end of the needle to the distal end. Since the tip 9a' of the needle 9 overlaps with the numerals 3a, the driver can exactly recognize, by his eyes, the position pointed by the needle 9. In this respect, the visual recognition and readability of the indicating device are improved. Since the needle 9 is sufficiently long, the indicating device looks larger than the actual one, as a whole, improving the valid of its commodity.

Figure 36:
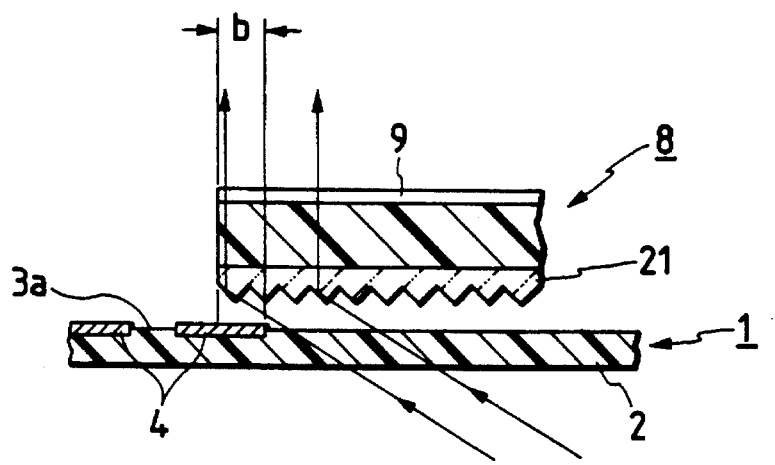
FIG. 36 is a cross sectional view showing a key portion of a seventh embodiment of the present invention.
Figure 37:
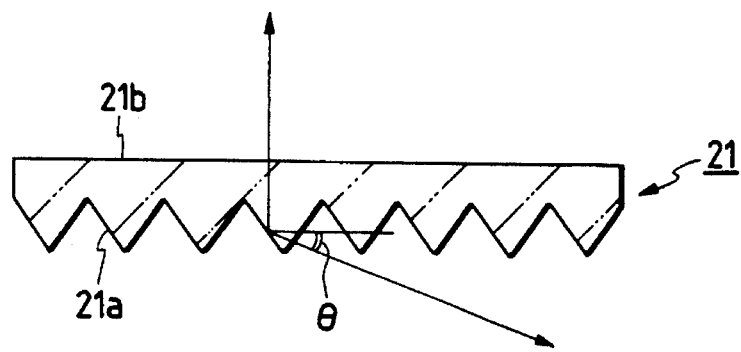
FIG. 37 is a cross sectional view showing how light enters, propagates through and emanates from a prism film.

A seventh embodiment of the invention will be described with reference to FIGS. 36 and 37. Also in this embodiment, the needle plate 8 is made of transparent material as in the conventional device. A prism film 21 is attached to the underside of the needle plate 8.

The needle plate 8 has a diameter slightly larger than the transparent portion 2 of the character plate 1. The opaque layer 4 is layered over the character plate 1, except the transparent portion 2, the numerals 3a, and the scale. A slit 9 as a needle radially extends from the center of the needle plate 8 to its circumferential outer edge. The prism film 21 (may be "SOLF", trade name, manufactured by SUMITOMO 3M company) is attached to the underside of the needle plate 8 at the location corresponding to the slit 9. The prism film 21 includes a light receiving surface 21a and a light emitting surface 21b. The light receiving surface 21a consists of a series of micro prisms. The light emitting surface 21b has a smooth surface. The light emitting surface 21b of the prism film 21 is brought into close contact with the underside of the needle plate 8.

When light is incident on the light receiving surface 21a of the prism film 21 at a small angle θ smaller than about 20°, the light passes through prism film 21. At this time, the light emanating from the light emitting surface 21b is substantially orthogonal to the light emitting surface 21b, viz., it has a directivity.

Even in such a case where the slit 9 extends up to the circumferential outer edge of the needle plate 8, and the outer end part of the needle plate 8 overlaps with the opaque layer 4 on the character plate 1, and the overlapping part b is unsatisfactorily illuminated with back-light, the slit 9 shines uniformly over its entire length since the prism film 21 is attached to the underside of the needle plate 8, that is, the light enters and propagates through the prism 21, and emanates from the prism in the direction at a right angle to the needle plate 8. Accordingly, the driver can clearly see the needle shining at bright over it full length from the base end to the distal end. A clear indication by the needle and a good readability are secured. With use of the long slit or needle 9, the indicating device looks larger than the actual one, leading to improvement of the valid of commodity.

Figure 38:
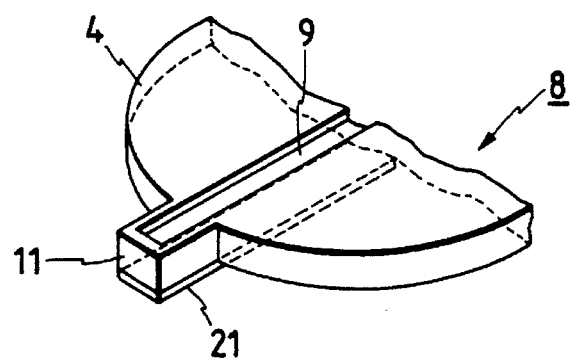
FIG. 38 is a perspective view showing a needle plate according to an eighth embodiment of the present invention.
Figure 39:
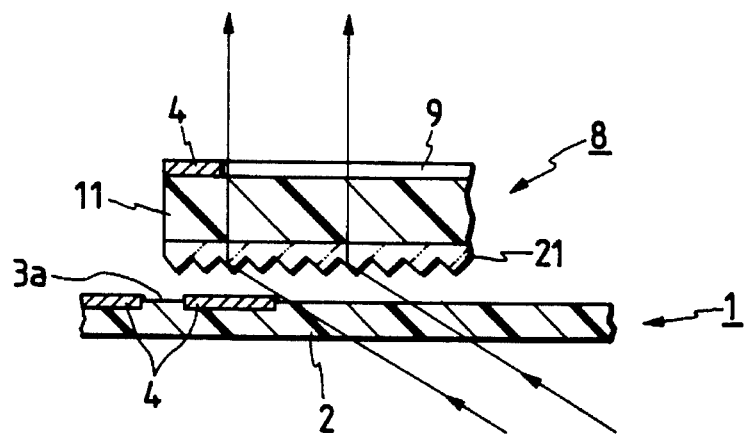
FIG. 39 is a cross sectional view showing a key portion of the embodiment of FIG. 38.

An eighth embodiment of the present invention will be described with reference to FIGS. 38 and 39. An indicator protrusion 11 is protruded, along the slit 9, from the circumferential edge of the needle plate 8 till it overlaps with the numerals 3a and the scale. Specifically, a slit 9 is extended longitudinally on the protrusion 11 except the distal end thereof. A prism film 21 is attached to the underside of the needle plate 8 and the protrusion 11 at a location corresponding to the slit 9 formed thereon.

As described above, the slit 9 as a needle is extensively formed on the protrusion 11, which is extended to overlap with the numerals 3a and the scale 3b. The prism film 21 is attached to the underside of the needle plate 8 and the protrusion 11 at a location corresponding to the slit 9 formed thereon. The light enters and propagates through the prism 21, and emanates from the prism in the direction at a right angle to the needle plate 8. Accordingly, the driver can clearly see the needle shining at bright over it full length from the base end to the distal end.

Since the distal end part of the needle 9 overlaps with the numerals 3a, the driver can clearly see the point pointed by the needle 9. Accordingly, a clear indication by the needle and a good readability are secured. With use of the long slit or needle 9, the indicating device looks larger than the actual one, leading to improvement of the valid of commodity.

The fluorescent material as the base material of light diffusion nature may be substituted by transparent resin containing a number of beads. If a color layer of a desired color is formed over the slit 9, the drive can see the needle of the desired color.

As described above, in the car-carried indicating device of the invention, the needle plate is made of light diffusion base material, and the slit as a needle, which emits light when it receives back-light, is extended up to the circumferential outer edge of the needle plate. A light gathering portion is formed on the underside of the needle plate at a location corresponding to the slit formed thereon. The optical fibers are buried in the needle plate, the slit is extended up to the circumferential outer edge of the needle plate, the light emitting end faces of the optical fibers are located within the slit, and the light receiving end faces the transparent portion. The slit is extended up to the circumferential outer edge of the needle plate, a prism film is disposed on the rear side of the needle plate at a location corresponding to the slit formed thereon. When light is incident the prism film at a preset angle, the prism film emits the light of a preset directivity. When the circumferential outer edge of the needle plate overlaps with the opaque layer part on the character plate and the lapping part is illuminated with insufficient amount of light, the slit shines uniformly over its entire length from the base end to the distal end, without any influence by the overlapping part. A clear indication by the needle and a good readability are secured. With use of such needle 9, the indicating device looks larger than the actual one, leading to improvement of the valid of commodity.

An indicator protrusion is protruded, along the slit, from the circumferential edge of the needle plate, till it overlaps with the numerals and the scale. The slit extends up to the tip of the indication protrusion. The slit or needle shining at a uniform brightness over its entire length overlaps with the numerals and the scale. This provides a clear indication by the needle. Accordingly, a clear indication by the needle and a good readability are secured. With use of such needle, the indicating device looks larger than the actual one, leading to improvement of the valid of commodity.

A ninth embodiment of the present invention will be described with reference to the accompanying drawings.

Figure 40:
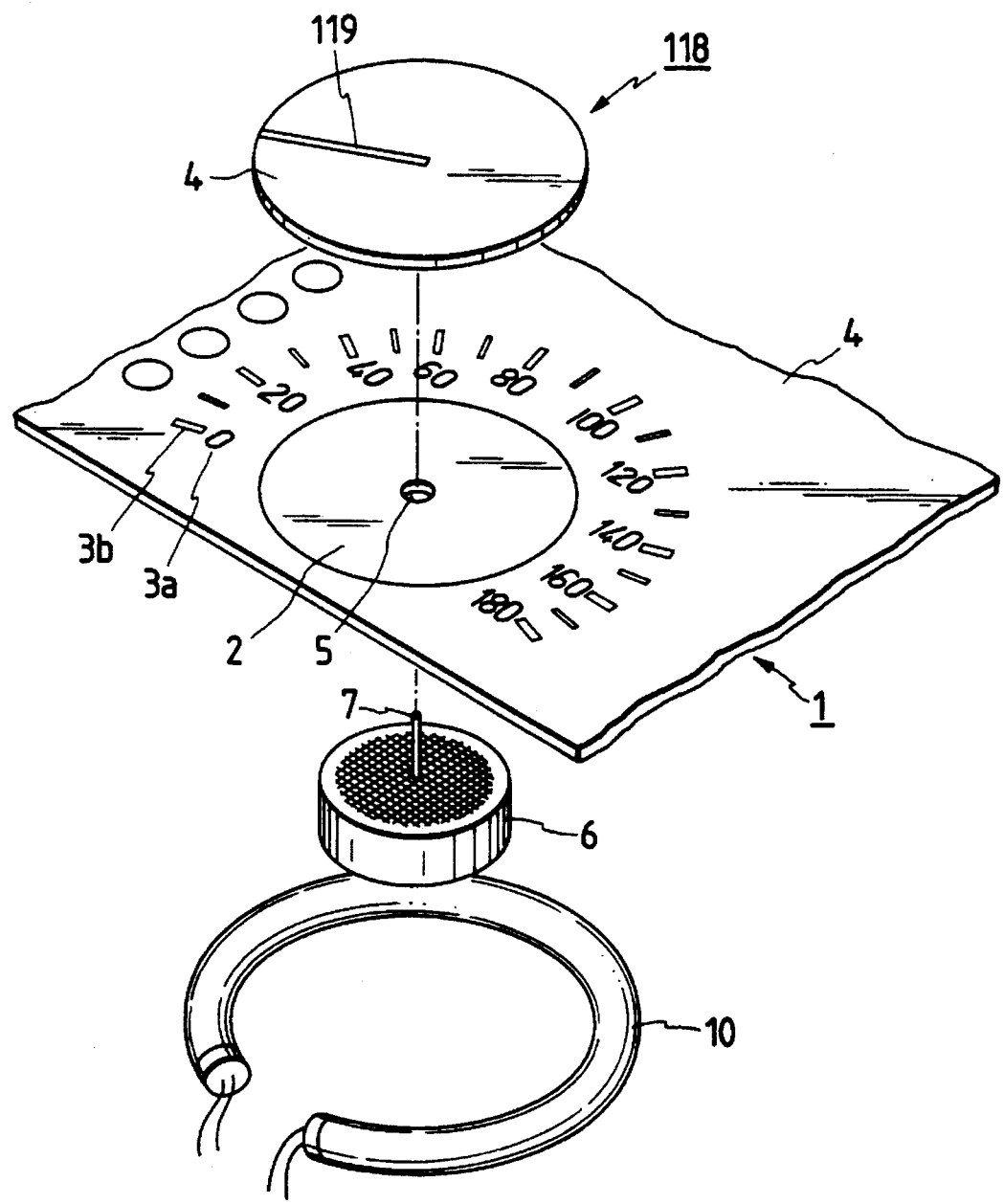
FIG. 40 is an exploded view showing a car-carried indicating device according to a ninth embodiment of the present invention.

FIG. 40 is an exploded view showing a car-carried indicating device according to a preferred embodiment of the present invention. In the figure, like or equivalent portions are designated by like reference numerals used in the figures of the drawings referred to the prior art description. As shown, a character plate 1 as a light diffusion plate contains a transparent portion 2, substantially circular in shape, at the location for display. A series of numerals 3a is disposed around the transparent portion 2, and a scale 3b is circularly disposed outside the series of numerals. An opaque layer 4 of black, for example, is layered over the upper surface of the character plate 1, except the transparent portion 2, the numerals 3a, and the scale 3b. A center hole 5 is formed at the center of the transparent portion 2. A rotating shaft 7 of the internal unit of the cross coil type, which is driven in accordance with determinate measuring quantities, passes through the center hole 5.

A disc-like needle plate 118 is disposed on the front side of the character plate 1. The needle plate 118 is made of a mixture of transparent material, such as acryl and polycarbonate, and fluorescent dye. The diameter of the needle plate 118 is slightly larger than that of the transparent portion 2. The rotating shaft 7 is connected to the needle plate 118. A transparent slit 119 is formed in the needle plate 118. The slit 119 (needle) serves as a needle extending from the center to the circumferential edge. The opaque layer 4 is also formed on the upper surface of the needle plate 118 except the slit 119. On the rear side of the character plate 1, a cold cathode tube 10 as a light source is disposed around the internal unit 6. The cold cathode tube 10 is shaped circular.

Figure 41:
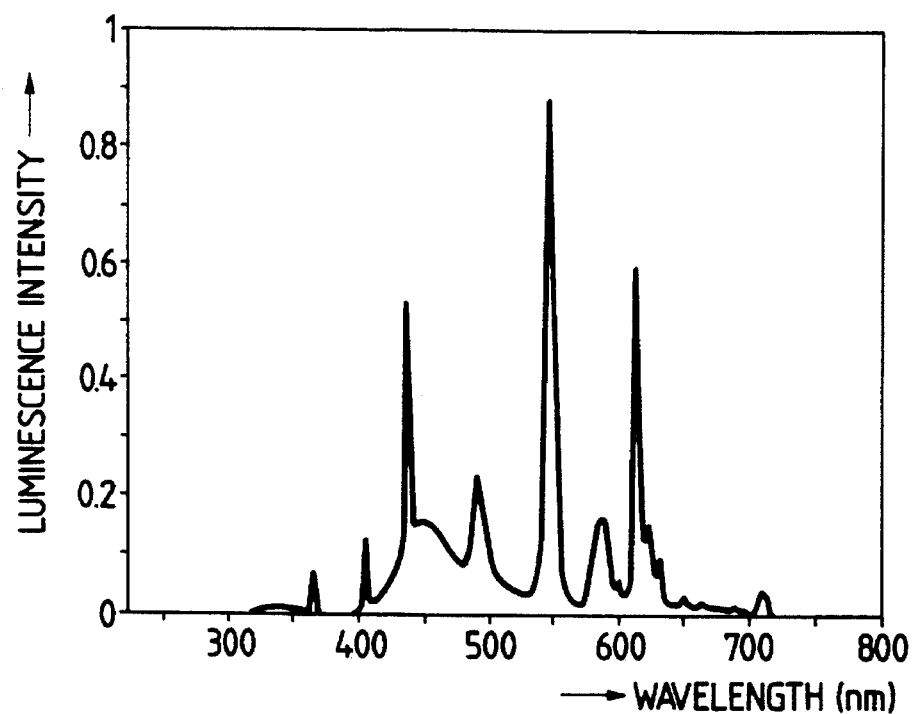
FIG. 41 is a graph showing the spectral characteristics of a light source for intensities of luminescence.

As seen from the spectral characteristics of the cold cathode tube 10 for the intensity of fluorescence, which are shown in FIG. 41, peaks of luminous intensity are observed at many wavelengths. Of those wavelengths, 540 nm provides the maximum peak of luminous intensity. Accordingly, luminescent material of which the light gathering wavelength characteristic lies at 540 nm and its near values, for example, fluorescent dye of yellow green, is selectively used for the needle plate 118. The needle plate 118, which made of the transparent material mixed with the thus selected fluorescent dye, efficiently transforms the quantity of light introduced thereinto into fluorescence. The brightness of the needle 119 is remarkably increased when comparing with that of the needle of the conventional device, and further is uniform over its entire length.

Figure 42:
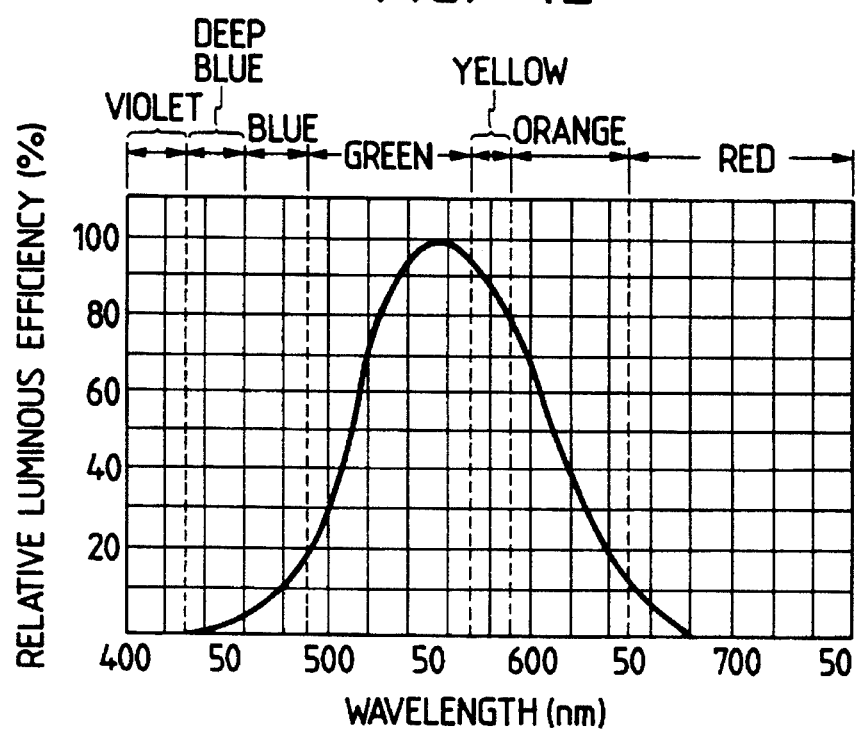
FIG. 42 is a graph showing the relative luminous efficiency curve of the human being.
Figure 43:
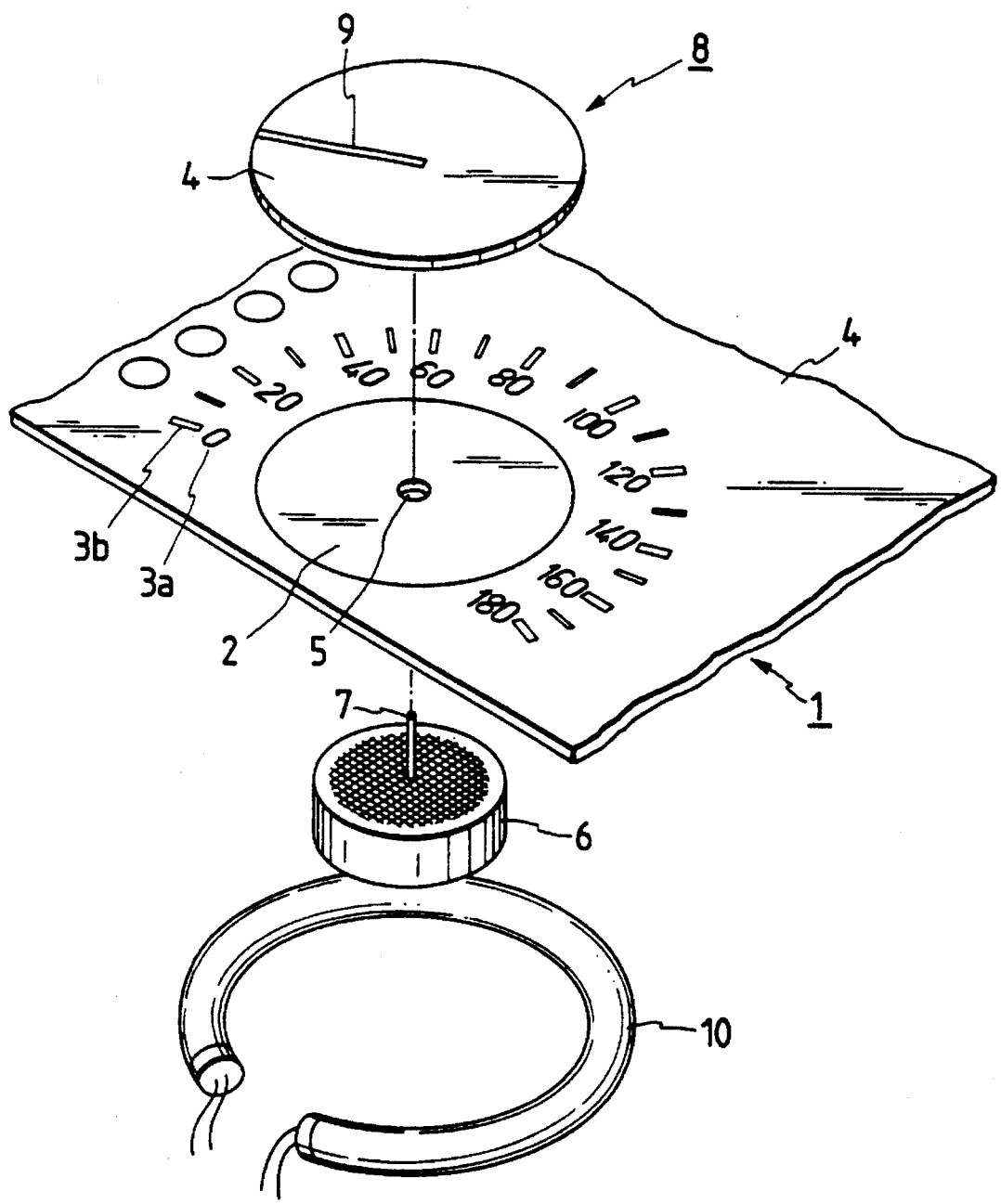
FIG. 43 is an exploded view showing a conventional car-carried indicating device.
Figure 44:
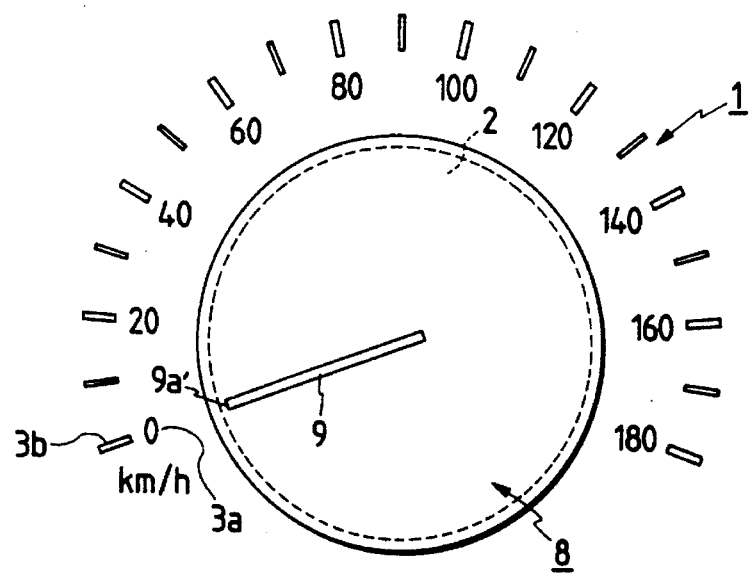
FIG. 44 is a front view showing the conventional car-carried indicating device.
Figure 45:
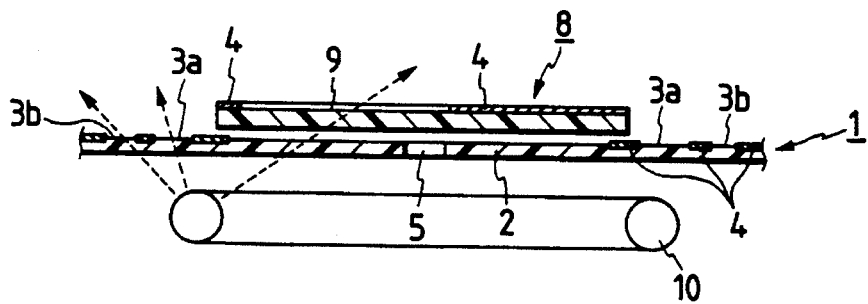
FIG. 45 is a cross sectional view of the car-carried indicating device of FIG. 43.
Figure 46:
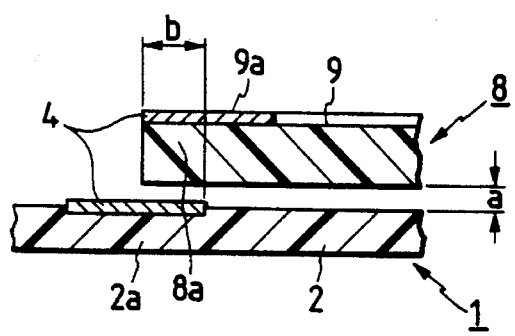
FIG. 46 is a cross sectional view showing a key portion of the car-carried indicating device shown in FIG. 45.

As shown in FIG. 42, the relative luminous efficiency of the human being peaks at 555 nm. Accordingly, the peak wavelength of the light source and the light gathering wavelength characteristics are selected so that the luminescence wavelength of the luminescent dye becomes equal to 555 nm. If so selected, a further increased brightness of the needle 119 is ensured the brightness of the needle 119 is increased, further providing a clear indication by the needle.

If required, the rear side of the distal end part of the needle 119 of the needle plate 118 may be tapered as shown in FIG. 9. The needle 119 may be formed like a bar-like protrusion as shown in FIG. 10. In the above-mentioned embodiment, the needle plate 118 is entirely made of the transparent material mixed with fluorescent dye. However, only the slit 119 portion may be made of such material.

As described above, the present invention can make efficient use of the light gathering characteristics of the light diffusion resin. Accordingly, the needle shines brightly uniformly over the entire length including the distal end thereof. In this respect, the driver can clearly perceive the point pointed by the needle.

While the present invention has been described above with respect to preferred embodiments thereof, it should of course be understood that the present invention should not be limited only to these embodiments but various changes or modifications may be made without departure from the scope of the invention as defined by the appended claims.

What is claimed is:

1. A car-carried indicating device including:

a character plate (1) having a substantially circular transparent portion (2) at an indicating position, a transparent numeral portion (3a) and a transparent scale portion (3b), said numeral portion and said scale portion being circularly arrayed around the circular transparent portion with opaque portions disposed therebetween;

a needle plate member (8) disposed on a front side of the character plate and being rotatable, said needle plate member including a fluorescent base plate and an opaque layer formed on an upper surface of said base plate except for a radially extending portion defining a slit in said opaque layer, said slit radially extending toward a circumferential outer edge of said needle plate member, a sufficient distance to at least partially overlap one of said opaque portions located between said circular transparent portion and an adjacent one of said numeral portion and said scale portion; and a light source (10) located on a rear side of the character plate (1) wherein light emitted by said light source passes through said circular transparent portion of said character plate and illuminates a rear side of said base plate such that fluorescence propagates through said plate member to thereby illuminate said slit.

2. A car-carried indicating device according to claim 1, further comprising:

a protrusion (11) integrally formed with said needle plate member (8) in such a manner that said protrusion (11) is protruded along said slit (9) from the circumferential edge of the needle plate member (8) to a position where said protrusion is extended adjacent to or overlapped with at least one of the numeral portion (3a) and the scale portion (3b).

3. A car-carried indicating device according to claim 2, wherein said protrusion (11) has a tapered part (12) which is tapered upwardly from the rear side of said needle plate member (8) to the upper surface at the distal end of said protrusion (ii).

4. A car-carried indicating device according to claim 2, further comprising:

a hot stamp (13) made of transparent material in white color, said hot stamp (13) being formed on the rear side of the portion of said needle plate member (8) and said protrusion (11) where said slit (9) is formed.

5. A car-carried indicating device according to claim 1, further comprising:

light gathering means (14, 31) formed on the rear side of said needle plate member (8), said light gathering means (14) being located corresponding to said slit (9).

6. A car-carried indicating device according to claim 5, in which said light gathering means (14) comprises a bar-like protrusion (14) with a distal end part (14a) which protruded from the circumferential outer edge of said needle plate member (8).

7. A car-carried indicating device according to claim 6, in which said opaque layer (4) is formed over an upper face of said distal end part (14a) of said bar-like protrusion (14) so as to extend thereover, and a tapered part (15) is tapered upward from a lower side of said protrusion (14) toward the upper face at said distal end part (14a) of said protrusion (14).

8. A car-carried indicating device according to claim 6, in which said needle plate member (8) and said protrusion (14) are made of predetermined fluorescent material.

9. A car-carried indicating device according to claim 5, in which said light gathering means (14, 31) comprises a light gathering portion (31) shaped like an isosceles triangle which protrudes from the rear side of the needle plate member (8) in a one-piece construction, and the vertex of angle of the light gathering portion (31) lies under a distal end part (9a) of said slit (9).

10. A car-carried indicating device according to claim 9, in which holes (32 and 32) are formed on both sides of the center of gravity (P) of said light gathering portion (31) in such a manner that the weight of the needle plate member (8) is reduced as a whole.

11. A car-carried indicating device according to claim 1, wherein said flourescent base plate is made of fluorescent material, and the light gathering wavelength characteristics of fluorescent dye constituting the fluorescent material are selected so as to be substantially equal to the peak wavelength in the spectral characteristics representing a variation of luminous intensity of said light source (10).

12. A car-carried indicating device according to claim 11, in which a peak wavelength in the spectral characteristics representing a variation of luminous intensity of said light source (10) versus wavelength is elected such that the luminance of said fluorescent dye has a wavelength at the peak of the relative luminous efficiency curve of the human being.

13. A car-carried indicating device including a character plate having a circular transparent portion, transparent numeral portion and a transparent scale portion, said numeral portion and said scale portion being circularly arrayed around the circular transparent portion with opaque portions disposed therebetween, a needle plate disposed over the circular transparent portion on a front side of said character plate and having a, fluorescent, slit-like needle portion radially extending toward a circumferential outer edge of said needle plate a sufficient distance to at least partially overlap one of said opaque portions located between said transparent portion and an adjacent one of said numeral portion and said scale portion, and a light source, located on a rear side of the character plate, for illuminating the numeral portion and the scale portion on the character plate and the needle portion of the needle plate, wherein at least said needle portion of said needle plate is made of fluorescent material, the fluorescent dye of the fluorescent material being selected so that the light gathering wavelength characteristics thereof are set to be substantially equal to the peak wavelength in the spectral characteristics representing a variation of luminous intensity of said light source.

14. A car-carried indicating device according to claim 13, wherein said needle portion includes a light gathering portion (31) shaped like an isosceles triangle which is disposed on the rear side of said needle plate (9), said needle plate having a slit (9), the light gathering portion (31) is made of the fluorescent material and a plural number of sawteeth (33)

each shaped like a wedge in cross section are formed on an upper surface of the light gathering portion (31) in a manner that the thickness is gradually reduced from the vertex angle (31*a*) of the light gathering portion (31) to an outer edge thereof.

15. A car-carried indicating device according to claim 13 wherein said needle portion includes a light gather portion (31) which is made of the fluorescent material, and the light gathering portion (31) contains curved surface portions (38) partially forming a spherical surface.

16. The car-carried indicating device according to claim 13, wherein the fluorescent dye is selected so that luminance wavelength thereof is positioned at the peak of the relative luminous efficiency curve of human being.

\* \* \* \* \*